(12) United States Patent
Groth

(10) Patent No.: US 11,788,495 B2
(45) Date of Patent: Oct. 17, 2023

(54) FLUID CONTROL SYSTEM

(71) Applicant: Square Head Inc., Kendrick, ID (US)

(72) Inventor: Robert Paul Groth, Kendrick, ID (US)

(73) Assignee: Square Head Inc., Kendrick, ID (US)

( * ) Notice: Subject to any disclaimer, the term of this patent is extended or adjusted under 35 U.S.C. 154(b) by 126 days.

(21) Appl. No.: 16/749,142

(22) Filed: Jan. 22, 2020

(65) Prior Publication Data
US 2021/0222652 A1      Jul. 22, 2021

(51) Int. Cl.
| | | |
|---|---|---|
| F02M 31/20 | (2006.01) | |
| F02M 31/07 | (2006.01) | |
| F02M 35/10 | (2006.01) | |
| F02D 41/14 | (2006.01) | |

(52) U.S. Cl.
CPC ......... *F02M 31/205* (2013.01); *F02D 41/144* (2013.01); *F02M 31/07* (2013.01); *F02M 35/1038* (2013.01); *F02D 2041/1415* (2013.01)

(58) Field of Classification Search
CPC .. F02M 31/205; F02M 31/07; F02M 35/1038; F02D 41/144; F02D 2041/1415
USPC .......................................................... 123/540
See application file for complete search history.

(56) References Cited

U.S. PATENT DOCUMENTS

| | | | | |
|---|---|---|---|---|
| 4,708,118 | A * | 11/1987 | Rawlings | ............... F02M 31/13 123/555 |
| 6,230,699 | B1 | 5/2001 | Mitsutani | |
| 6,295,973 | B1 | 10/2001 | Yang | |
| 6,332,459 | B1 | 12/2001 | Ehara et al. | |
| 6,532,807 | B1 * | 3/2003 | Krauss | ...................... F01P 7/16 73/114.68 |
| 6,990,947 | B2 * | 1/2006 | Kuzuyama | ............ F02D 35/025 123/294 |
| 8,200,412 | B2 * | 6/2012 | Nagasaki | .............. F02D 19/084 701/103 |
| 2018/0087464 | A1 | 3/2018 | Sekita | |

OTHER PUBLICATIONS

PCT Search Report and Written Opinion dated Feb. 5, 2021 for PCT Application No. PCT/US20/60756, 18 pages.

* cited by examiner

*Primary Examiner* — Lindsay M Low
*Assistant Examiner* — Omar Morales
(74) *Attorney, Agent, or Firm* — Lee & Hayes, P.C.

(57) ABSTRACT

A fluid control system for an engine may include an air pathway to carry air to the engine, a fuel pathway to carry a fuel to the engine, and at least one temperature control device to control temperatures of the air and the fuel. The temperature control device maintains the air and the fuel at a temperature based on a target air-fuel ratio and a target volume of the air and the fuel.

20 Claims, 4 Drawing Sheets

FLUID CONTROL SYSTEM

TECHNICAL FIELD

The present disclosure relates to fuel, air, and coolant use within an engine. More particularly, the present disclosure relates to the temperature conditioning of fuel, air, and coolant as they are introduced into an internal combustion engine, and the adjustment of air-fuel ratios based on the temperatures of the air, fuel, and coolant and the temperature of the engine.

BACKGROUND

Engines are designed to convert one form of energy into mechanical energy. Internal combustion engines (ICE) utilizes the combustion of a fuel such as gasolines of different octanes or diesel fuels (herein collectively referred to as fuel) ignited in a combustion chamber. The ignition, combustion, or burning of a fuel within the combustion chamber creates relatively higher-temperature and higher-pressure gases within the combustion chamber. These relatively higher-temperature and higher-pressure gases direct force on, for example, a piston, a turbine blade, or other object. The forces on the piston, turbine blade, or other object moves these components over a distance. In this manner, the chemical energy within the fuel is transformed into mechanical energy that may be used to move a vehicle, for example.

The ratio of fuel and air introduced into the combustion chamber may be variable and controlled by, for example, an engine control module (ECM) associated with the ICE. The air-fuel ratio determines whether a mixture of the fuel and air is combustible at all, how much energy is being released, and how much unwanted pollutants are produced in the reaction. In one example, a range of fuel to air ratios may exist outside of which ignition will not occur that may be referred to as the lower and upper explosive limits. A stoichiometric mixture of fuel and air may include enough air to completely burn the available fuel. The ratios may be varied by the ECM based on a number of parameters including the size of the combustion chamber(s), the state of the throttle used to increase or decrease an amount of fuel and air introduced into the combustion chambers and regulate power output of the ICE, and the type of fuel, among other parameters.

An example system for reducing the thermal load of an internal combustion engine without substantially reducing its power output is described in U.S. Pat. No. 9,328,675 (hereinafter referred to as the '675 reference). In particular, the '675 reference describes a system and method for adjusting an engine air-fuel ratio responsive to one or more of a charge air over-temperature, a coolant over-temperature and an engine efficiency parameter. To reduce the thermal load, an air flow ratio in the engine system is reduced when an input variable exceeds or falls below a predefined threshold.

The '675 reference does not describe temperature conditioning of fuel, air, and coolant as they are introduced into an internal combustion engine including the pre-cooling or pre-heating of the fuel, air, and/or coolant. Further, the '675 reference does not describe the adjustment of air-fuel ratios based on the temperatures of the air, fuel, and coolant and the temperature of the engine.

Examples of the present disclosure are directed toward overcoming the deficiencies described above.

SUMMARY

In an example of the present disclosure, a fluid control system for an engine may include an air pathway to carry air to the engine, a fuel pathway to carry a fuel to the engine, and at least one temperature control device to control temperatures of the air and the fuel. The temperature control device maintains the air and the fuel at a temperature based on a target air-fuel ratio and a target volume of the air and the fuel.

In another example of the present disclosure, a method of controlling fluid temperature within an engine. The method may include determining a target air-fuel ratio based on at least one parameter of an operation of the engine, and, with a first sensor, detecting a temperature of air introduced into the engine. Further, the method may include, with a second sensor, detecting a temperature of a fuel introduced into the engine, and, with a controller, determining a target temperature of the air and a target temperature of the fuel to meet the target air-fuel ratio. The method may further include, with a first temperature control device, adjusting the temperature of the air before introduction into a combustion chamber of the engine, and, with a second temperature control device, adjusting the temperature of the fuel before introduction into the combustion chamber of the engine.

In yet another example of the present disclosure, a fluid temperature control feedback system may include a first sensor to detect a temperature of air introduced into an engine, and a second sensor to detect a temperature of a fuel introduced into the engine. The system may further include a controller to determine a target temperature of the air and a target temperature of the fuel to meet a target air-fuel ratio. Further, the system may include a first temperature control device to adjust the temperature of the air before introduction into the engine, and a second temperature control device, adjusting the temperature of the fuel before introduction into the engine. The controller uses data representing the temperatures of the air and the fuel as detected by the first sensor and the second sensor to instruct the first temperature control device and the second temperature control device.

DETAILED DESCRIPTION

Figure 1:
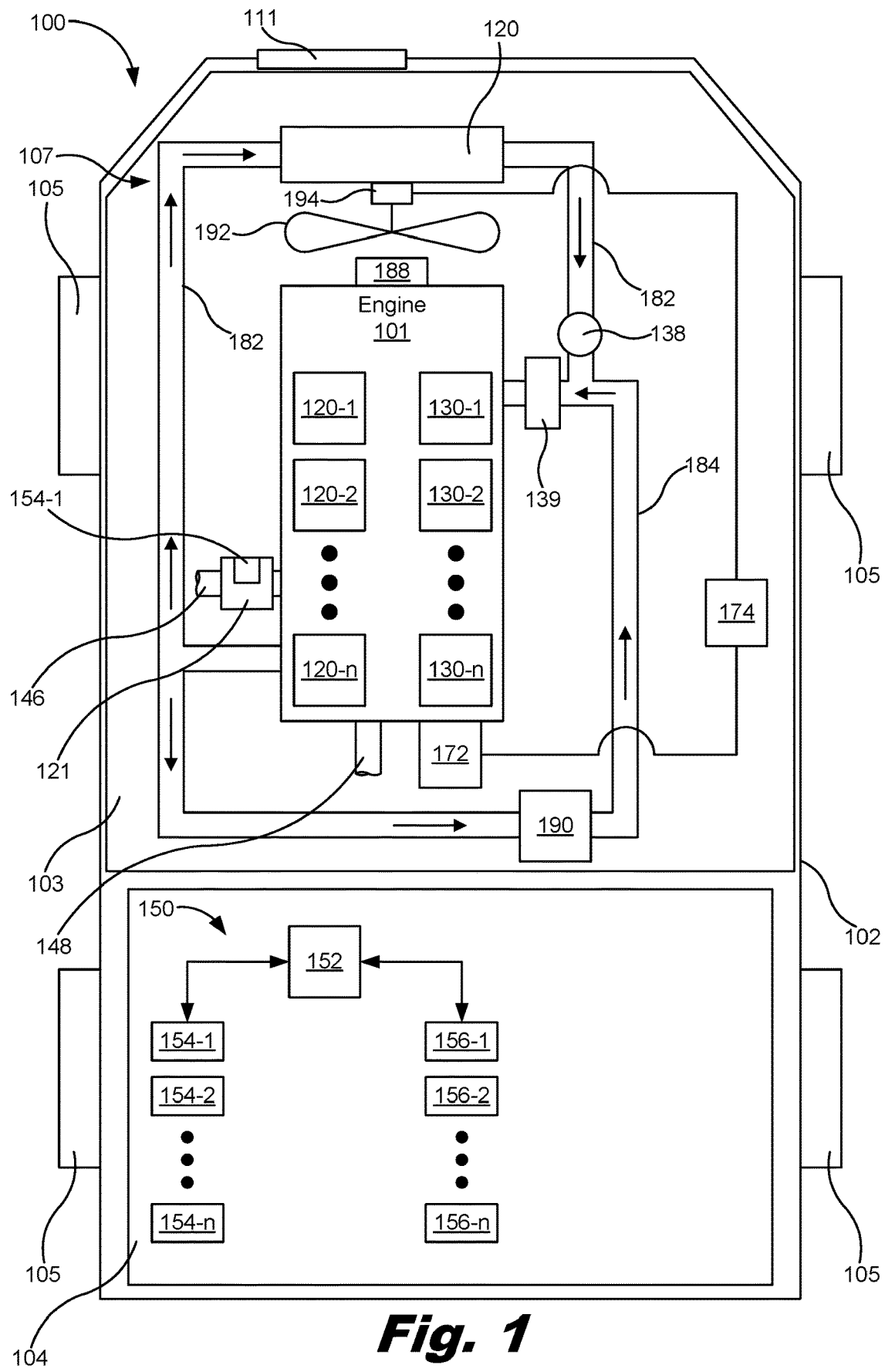
FIG. 1 is a schematic illustration of a fluid control system in a motor vehicle, according to an example of the principles described herein.
Figure 2:
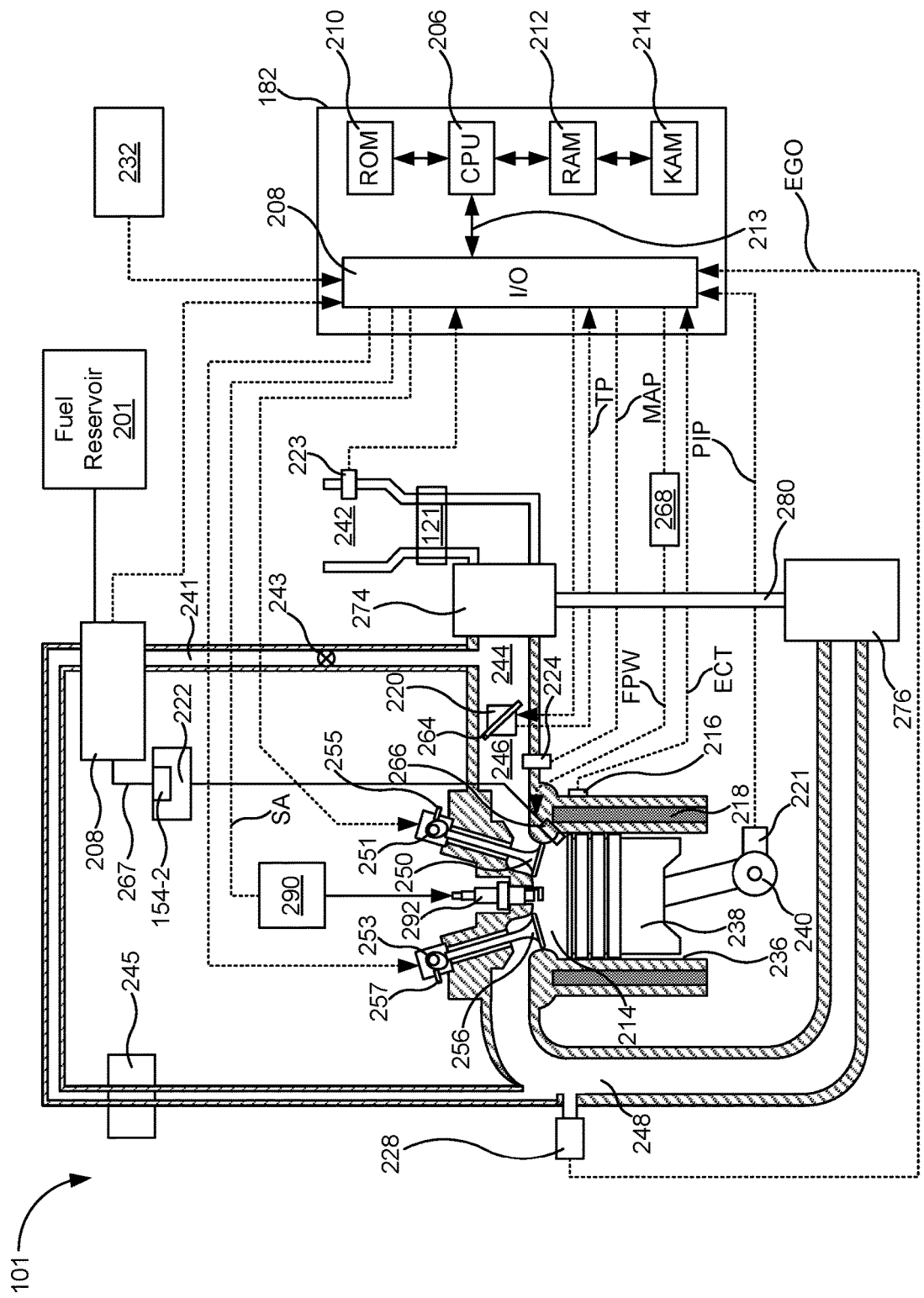
FIG. 2 is a schematic illustration of a combustion chamber of the engine of FIG. 1, according to an example of the principles described herein.

Wherever possible, the same reference numbers will be used throughout the drawings to refer to the same or like parts. Referring to FIGS. 1 and 2, an example embodiment of fluid control system 100 in a motor vehicle 102 is illustrated schematically. Further, FIG. 2 is a schematic illustration of a cylinder 214 (also referred here herein as a "combustion chamber") of the engine 101 of FIG. 1, according to an example of the principles described herein. The term "fluid" as used herein is meant broadly to refer to any substance that continually deforms (flows) under an applied shear stress, or external force. Thus, fluids are a phase of matter and includes liquids and gases.

The vehicle 102 may be any vehicle that utilizes an internal combustion engine that combusts a fuel such as gasolines of different octanes, diesel fuels, natural gas, methane, propane, hydrogen, and other combustible fuels (herein referred to collectively as fuel). Further, the vehicle 102 utilizes air to combust the fuel within the internal combustion engine. Still further, the vehicle 102 utilizes a coolant to cool the internal combustion engine. The vehicle 102 includes drive wheels 105, a load compartment 104, and an under-hood compartment 103. The under-hood compartment 103 may house various components of the vehicle 102. For example, the under-hood compartment 103 may house an internal combustion engine 101 among other elements found within a vehicle 102.

The internal combustion engine 101 includes at least one combustion chamber which may receive intake air via an intake passage 146 and may discharge combustion gases via an exhaust passage 248. In one example, the engine 101 include a plurality of combustion chambers. In one example, the intake passage 146 may be configured as a ram-air intake wherein the dynamic pressure created by moving the vehicle 102 may be used to increase a static air pressure inside an intake manifold of the internal combustion engine 101. As such, this may allow a greater mass flow of air through the internal combustion engine 101, thereby increasing power produced by the engine 101. The engine 101 as illustrated and described herein may be included in a vehicle 102 such as a road automobile, a hauling vehicle, or a construction vehicle, among other types of vehicles. While the example applications of the engine 101 is described herein with reference to a vehicle 102, various types of engines and vehicle propulsion systems may be used, including passenger cars and trucks, among other types of vehicles.

The under-hood compartment 103 may further include a cooling system 107 that circulates coolant through the internal combustion engine 101 to absorb waste heat. The cooling system 107 distributes the heated coolant to a radiator 120 and/or a heater core 190 via coolant lines 182 and 184, respectively. In one example, the cooling system 107 may be coupled to the engine 101 and may circulate engine coolant from the engine 101 to the radiator 120 via an engine-driven water pump 188, and back to the engine 101 via a coolant line 182. An engine-driven water pump 188 may be coupled to the engine and rotated proportionally to an engine speed via a belt, chain, or similar mechanism. In one example, the engine-driven water pump 188 may circulate coolant through passages in the block, head, and other portions of the engine 101 to absorb engine heat. The heat from the engine 101 absorbed by the coolant may then be transferred via the radiator 120 to ambient air. The heat transferred to the coolant jacket integrated in the liquid cooling engine may be extracted from the coolant again in a heat exchanger which may be arranged in the front-end region of the vehicle 102. Further, the heat released from combustion of the fuel may be transmitted not only to the walls delimiting the combustion chamber, the exhaust gas flow and where applicable the engine coolant, but also to the engine oil. Therefore, further coolers may be provided, for example, for cooling the transmission oil on automatic transmissions and/or for cooling hydraulic fluids, in particular hydraulic oil which is used for hydraulically activated adjustment devices or for steering assistance. However, due to heat conduction and natural convection, the heat dissipation via the oil pan is often insufficient to observe the maximum permitted oil temperature, so an additional oil cooler may be provided. In one example, where the water pump 188 is a centrifugal pump, the pressure (and resulting flow) produced by the water pump 188 may be proportional to the crankshaft speed, which in the example of FIG. 1, may be directly proportional to the engine speed. The temperature of the coolant may be regulated by a thermostat valve 138, located in the cooling line 182, which may be kept closed until the coolant reaches a threshold temperature.

Coolant may flow through coolant line 182, as described above, and/or through coolant line 184 to a heater core 190 where the heat may be transferred and/or dumped to a load compartment 104, and the coolant may flow back to engine 101. In some examples, the engine-driven water pump 188 may operate to circulate the coolant through both coolant lines 182 and 184. A further heat exchanger may include the air conditioning condenser of an air conditioning system which works based on a cold evaporation process. In this process, the temperature of the air flow supplied to the passenger compartment may be lowered by passing air over an evaporator, wherein the air flow extracts the heat from refrigerant flowing internally through the evaporator.

In one example, at least one blower (not shown) and cooling fan 192 may be included in cooling system 107 to provide airflow assistance and to augment a cooling airflow through the under-hood components. For example, cooling fan 192, coupled to the radiator 120, may be operated when the vehicle 102 is moving and the engine 101 is running to provide cooling airflow assistance through the radiator 120. The cooling fan 192 may draw a cooling airflow into the under-hood compartment 103 through an opening in the front-end of the vehicle 102, for example, through a grill 111. Such a cooling air flow may then be utilized by the radiator 120 and other under-hood components (e.g., fuel system components, batteries, etc.) to keep the engine and/or transmission cool. Further, the air flow may be used to reject heat from a vehicle air conditioning system. Further still, the airflow may be used to enhance the performance of a turbocharged/supercharged engine that is equipped with intercoolers that reduce the temperature of the air that goes into the intake manifold/engine.

The cooling fan 192 may be coupled to, and driven by, the engine 101, via an alternator 172 and a system battery 174. The cooling fan 192 may also be mechanically coupled to the engine 101 via an optional clutch (not shown). During engine operation, the engine-generated torque may be transmitted to an alternator 172 along a drive shaft (not shown). The generated torque may be used by the alternator 172 to generate electrical power, which may be stored in an electrical energy storage device, such as the system battery 174. The battery 174 may then be used to operate an electric cooling fan motor 194 coupled to the cooling fan 192. Thus, operating the cooling fan may include, mechanically powering the rotation of the cooling fan 192 via a rotational output of the engine 101 for example, during operation of the engine 101. Additionally or optionally, operating the cooling fan 192 may include, electrically powering the cooling fan 192 rotation from engine rotational input, through the alternator 172 and system battery 174, for example, when engine speed is below a threshold (for example, when the engine is in idle-stop). In another example, the cooling fan 192 may be an electric fan, and operating the cooling fan 192 may include enabling the electric cooling fan motor 194 coupled to the cooling fan 192.

An engine controller may adjust the operation of cooling fan 192 based on vehicle cooling demands, vehicle operating conditions, and in coordination with engine operation. In one example, during a first vehicle moving condition, when the engine 101 is operating, and vehicle cooling and airflow assistance from the cooling fan 192 is desired, the cooling fan 192 may be operated mechanically (powered by the engine, through the clutch) or electrically (powered by enabling battery-driven electric motor 194), to provide airflow assistance in cooling under-hood components within the under-hood compartment 103. The first vehicle moving condition may include, for example, when an engine temperature is above a threshold. In another example, during a second vehicle moving condition, when airflow assistance is not desired (for example, due to sufficient vehicle motion-generated airflow through the under-hood compartment), operation of the cooling fan 192 may be discontinued by disabling the fan motor 194 or uncoupling the cooling fan 192 from the engine 101. The second vehicle moving condition may further include the engine 101 being deactivated (for example, the engine may be in idle-stop). However, the cooling fan 192 may continue to free-wheel due to the natural flow of ambient air through the fan blades and the influence of the ram air pressure impacting the fan blade surface. The reaction torque of the free-wheeling fan blades may result in a reduced pressure drop across the cooling fan 192. The reduced pressure drop may reduce cooling system 107 resistance, increase a cooling airflow through the cooling fan 192, and consequently generate a cooling drag. The resultant increase in aerodynamic drag may reduce the fuel economy of vehicle 102.

The various components described herein with reference to FIG. 1 may be controlled by a control system 150, which includes a controller 152 with computer readable instructions stored in at least one memory device for carrying out routines and subroutines for regulating systems of the vehicle 102. The controller 152 may include an ECM, for example. The control system 150 may be included within the load compartment 104 of the vehicle 102, the under-hood compartment 103 of the vehicle 102, or combinations thereof. The control system 150 may be include a number of sensors 154-1, 154-2, 154-*n* (collectively referred to herein as 154), where "n" denotes any number of sensors 154. The control system 150 may include a number of actuators 156-1, 156-2, 156-*n* (collectively referred to herein as 156), where, again, "n" denotes any number of actuators 156.

The controller 152 is communicatively coupled to the sensors 154 and actuators 156, and data in the form of instructions may be transmitted to the sensors 154 and actuators 156 to instruct the sensors 154 and actuators 156 to perform their functions described herein. As instructed by the controller 153, the sensors 154 may sense a number of events or changes in the environment internal and external to the engine 101, the vehicle 102, and the fluid control system 100. The sensed information may be transmitted to the controller 152 and processed according to the methods described herein.

Further, the controller 152 may use the data obtained from the sensors 154 to control the number of actuators 156. The actuators 156 may include any component within the engine 101, the vehicle 102, and/or the fluid control system 100 that is responsible for moving and controlling (i.e., a "mover") any number of mechanisms or systems therein. The actuators 156 are any mechanism by which the controller 152 of the control system 150 acts on the engine 101, the vehicle 102, the fluid control system 100 and/or the environment within and without these elements. The actuators 156 may include, for example, valves, hydraulic pistons, pneumatic pistons, electromechanical devices, twisted and coiled polymer (TCP) actuators, supercoiled polymer (SCP) actuators, thermal actuators, magnetic actuators, mechanical actuators, shape-memory alloy actuators, other types of actuators, and combinations thereof. Thus, as instructed by the controller 152, the actuators 156 may act on any number of mechanisms or systems within the engine 101, the vehicle 102, the fluid control system 100 and/or the environment within and without these elements The fluid control system 100 that is used in conjunction with the engine 101 may include an air pathway defined by the intake passage 146, the exhaust passage 248, the grill 111, the intake air passages 242, 244, 246, the exhaust gas recirculation (EGR) passage 241, the exhaust passage 248, and other air pathways depicted in FIGS. 1 and 2. An air pathway control device 121 may be coupled to, in one example, the intake passage 146 to control the temperature of the air that enters the engine 101. In one example, the air pathway control device 121 may cool and/or heat the air that passes through the air pathways throughout the fluid control system 100. More regarding the control of the air as a fluid within the fluid control system 100 is described herein. An air sensor 154-1 associated with the air pathway control device 121 may detect the temperature of the air throughout the air pathways of the fluid control system 100 and engine 101 and transmit that information to the controller 152. For ease of depiction, the air sensor 154-1 is depicted in FIG. 1 as being physically coupled to the intake passage 146 and communicatively coupled to the controller 152. The controller 152 may process the data, and, based on the methods described herein, instruct the air pathway control device 121 (acting as an actuator 156) to alter the temperature of the air within the air pathways. The air pathway control device 121 may also be instructed to control a volume of air that enters the engine 101.

The air pathway control device 121 may also be instructed to control a volume of air that enters the engine 101. In this example, the air sensor 154-1 may detect a volume of air that is moved through, for example, the intake air passages 242, 244, 246. The air sensor 154-1 may transmit information regarding the volumes to the controller 152. The controller 152 may process the data, and, based on the methods described herein, instruct the air pathway control device 121 to alter the volume of the air that moves through the intake air passages 242, 244, 246.

The fluid control system 100 that is used in conjunction with the engine 101 may also include a fuel pathway defined by the fuel injector 266, the fuel line 267, the fuel system 208, the fuel reservoir 201, and other elements associated with the fuel pathway between the fluid reservoir 201 and the fuel injector 266 depicted in FIGS. 1 and 2. The fuel pathway carries a combustible fuel to the engine 101, which, in turn, combusts the fuel in order to convert the fuel into energy used to mechanically drive the engine and any loads the engine is used to move.

A fuel pathway control device 222 may be coupled to, in one example, the fuel line 267 to control the temperature of the fuel that enters the engine 101. In one example, the fuel pathway control device 222 may include heating and/or cooling elements to achieve a designated temperature of the fuel and cool and/or heat the fuel that passes through the fuel pathways throughout the fluid control system 100. More regarding the control of the fuel as a fluid within the fluid control system 100 is described herein. A fuel sensor 154-2 associated with the fuel pathway control device 222 may detect the temperature of the fuel throughout the fluid control system 100 and transmit that information to the controller 152. For ease of depiction, the fuel sensor 154-2 is depicted in FIGS. 1 and 2 as being both physically coupled to the fuel line 267 (in FIG. 2) and communicatively coupled to the controller 152 (in FIG. 1). The controller 152 may process the data, and, based on the methods described herein, instruct the fuel pathway control device 222 (acting as an actuator 156) to alter the temperature of the fuel within the fuel pathways.

The fuel pathway control device 222 may also be instructed to control a volume of fuel that enters the engine 101 in addition to or in place of the fuel system 208. In this example, the fuel sensor 154-2 may detect a volume of fuel that is moved through, for example, the fuel injector 266 and/or the fuel line 267. The fuel sensor 154-2 may transmit information regarding the volumes to the controller 152. The controller 152 may process the data, and, based on the methods described herein, instruct the fuel pathway control device 222 and/or the fuel injector 266 to alter the volume of the fuel that moves through the fuel pathways.

The air pathway control device 121 and the fuel pathway control device 222 maintain the air and the fuel at a temperature based on a target air-fuel ratio and a target volume of the air and the fuel. More regarding the control of temperatures and volumes of the air and fuel are described herein.

The fluid control system 100 may also include a coolant pathway to carry a coolant to the engine 101. The coolant pathway may be defined by the radiator 120, the heater core 190, the coolant lines 182 and 184, the thermostat valve 138, passageways within the engine 101 through which the coolant moves to cool the engine 101, other elements and passageways, and combinations thereof. The coolant pathway carries a coolant such as an ethylene glycol solution, a propylene glycolsolution, methanol, water, and an antifreeze solution, among other coolants and combinations thereof that may be used to regulate the temperature of the engine and other elements within the vehicle 102. Coolant pathway control devices acting as actuators 156 may include the radiator 120, the heater core 190, and the thermostat valve 138 and may be used to control the temperature of the coolant that enters the engine 101. In one example, the coolant pathway control devices may cool and/or heat the coolant that passes through the coolant pathways throughout the fluid control system 100. More regarding the control of the coolant as a fluid within the fluid control system 100 is described herein. The sensors 154 described herein including the coolant sensor 139 may detect the temperature and/or volume of the coolant throughout the fluid control system 100 and transmit that information to the controller 152. The controller 152 may process the data, and, based on the methods described herein, instruct the coolant pathway control devices 120, 190, 138 (acting as actuators 156) to alter the temperature of the coolant within the coolant pathways. The coolant pathway control devices 120, 190, 138 may also be instructed to control a volume of coolant that enters the engine 101 via, for example, the adjustment of the thermostat valve 138.

Throughout the examples described herein, the air pathway control device 121, the fuel pathway control device 222, and the coolant pathway control devices 120, 190, 138 maintain the air, the fuel, and the coolant at a temperature that allows for the target air-fuel ratio and target volume of the air and the fuel to be obtained. Thus, in this example, the coolant may play a role in altering temperatures within the engine 101 to assist in reaching the target air-fuel ratio and target volume of the air and the fuel. More regarding the control of temperatures and volumes of the air, fuel, and coolant are described herein.

The controller 152 of the system 100 may be used to control at least one function of the engine 101, the sensors 154, the actuators 156, the radiator 120, the heater core 190, the thermostat valve 138, the electric cooling fan motor 194, the air pathway control device 121, the fuel system 208, the fuel pathway control device 222, the fuel injector 266, the ignition system 290, the throttle 220, the first cam actuation system 251, the second cam actuation system 253, the compressor 274, the exhaust turbine 276, the EGR valve 243, and other elements described herein to bring about the obtainment of the target air-fuel ratio and target volume of the air and the fuel. Stated in another manner, the controller 152 of the system 100 may be used to control fuel systems, air systems, and coolant systems of the vehicle 102 in order to obtain the target air-fuel ratio and target volume of the air and the fuel during various operating conditions of the engine 101. This is done in order to obtain a stronger and more consistent power stroke of the pistons 238 within the cylinders 214 (also referred to as "combustion chambers"). Further, cleaner emissions from the engine 101 may be obtained using the methods and systems described herein because more of the fuel introduced into the cylinders 214 is combusted. In some examples where the engine 101 consumes diesel fuel, the combustion rate of the diesel fuel may be so effective, the use of diesel exhaust fluid (DEF) used to burn excess oxides and exhaust may no longer be necessary. Still further, fuel mileage will increase since combustion will be more robust and consistent using the methods and systems described herein. The life of the engine 101 and associated elements and sub-elements including turbo systems, coolants, and oils may be increased as well when the methods and systems described herein are employed. The overall temperature of the engine 101 and fluids may be lower and more consistent.

Further, using the methods and systems described herein may cause the fuel to remain more stable. For example, in the case where diesel fuel is combusted in the engine 101, a constant fuel temperature may result in the diesel fuel no longer freezing or "gelling" in the fuel reservoir 201, the fuel line 267, fuel filters, and other elements of the fuel system of the vehicle 102 during operation of the engine 101. The methods and systems described herein may reduce condensation resulting in a decrease or elimination of water within the engine 101. In one example, the temperature of the air, fuel, and/or coolant may be maintained within a threshold range. In this example, an upper threshold and a lower threshold may be applied such that when the temperature of the air, fuel, and/or coolant exceed the upper or lower thresholds, the fluid control system 100 may cause the temperatures of the air, fuel, and/or coolant to return to temperatures between the upper threshold and a lower threshold.

The controller 152 of the system 100 may be used to control at least one function of the engine 101, the sensors 154, and the actuators 156. Examples of actuators 156 may include the radiator 120, the heater core 190, the thermostat valve 138, the electric cooling fan motor 194, the air pathway control device 121, the fuel system 208, the fuel pathway control device 222, the fuel injector 266, the ignition system 290, the throttle 220, the first cam actuation system 251, the second cam actuation system 253, the compressor 274, the exhaust turbine 276, the EGR valve 243, and other actuators described herein to bring about the obtainment of the target air-fuel ratio and target volume of the air and the fuel.

The controller 152 of the system 100 may be used to control at least one function of the sensors 154, including, for example, the mass air flow sensor 223, the manifold pressure sensor 224, the EGR sensor 245, the exhaust gas sensor 228, the temperature sensor 216, and other sensors described herein to sense the temperatures, pressures, and other environmental characteristics of the fuel, the air, and the coolant introduced into the engine 101 and other elements of the fluid control system 100. The controller 152 may transmit instructions to the sensors 154 described herein to cause the sensors 154 to collect data related to properties of the environment of the engine 101 and the elements described herein. The data collected by the sensors 154 described herein may be transmitted to the controller 152 for processing according to the methods described herein.

The controller 152 may use the data collected by the sensors 154 to control at least one function of the engine 101, the sensors 154, the actuators 156, the radiator 120, the heater core 190, the thermostat valve 138, the electric cooling fan motor 194, the air pathway control device 121, the fuel system 208, the fuel pathway control device 222, the fuel injector 266, the ignition system 290, the throttle 220, the first cam actuation system 251, the second cam actuation system 253, the compressor 274, the exhaust turbine 276, the EGR valve 243, and other elements described herein. The controller 152 may send control signals to these actuators 156 and other devices to control the manner in which the engine 101 operates and the manner in which the temperatures and volumes of the fuel, air, and coolant are adjusted to obtain the target air-fuel ratios and a target volumes of the air and the fuel. In the examples described herein, the controller 152 controls at least the air pathway control device 121, the fuel pathway control device 222, and the coolant pathway control devices (e.g., including the radiator 120, the heater core 190, and the thermostat valve 138 among other devices) in order to change the temperatures of the fuel, air, and coolant.

In one example, the controller 152, the sensors 154, and the actuators 156 may for a feedback loop throughout the operation of the fluid control system 100 and the engine 101 in order to maintain the target air-fuel ratio and the target volume of the air and the fuel introduced into the engine 101. In this example, data obtained by the controller 152 from the sensors 154 may be used to adjust the functioning of the actuators 154 and, in turn, the air-fuel ratio and the volume of the air and the fuel introduced into the engine 101. The resultant changes made to the air-fuel ratio and the volume of the air and the fuel introduced into the engine 101 may be reported to the controller 152. The controller 152 may again instruct the sensors 154 to sense the environmental characteristics of the fuel, the air, and the coolant introduced into the engine 101 and transmit data representing the environmental characteristics to the controller 152. The controller 152 may then use the newly-transmitted data from the sensors 154 to again adjust the functioning of the actuators 154. In this manner, a feedback loop is created such that the air-fuel ratio and the volume of the air and the fuel introduced into the engine 101 may be continually or at intervals (e.g., a one second intervals) adjusted to meet the target air-fuel ratio and the target volume of the air and the fuel introduced into the engine 101. The feedback loop of this example may be maintained as the vehicle 102 travels throughout different environments where altitudes, temperatures, humidity levels, barometric pressures, and other environmental characteristics change since these environmental variables may change the manner in which, for example, the ideal gas law (i.e., PV=nRT) applies within the fluid control system 100. For example, changes in altitude may change the pressures and/or volumes of air (e.g., oxygen within environmental air) the engine 101 and the air pathway control device 121, the fuel pathway control device 222, and the coolant pathway control devices 120, 190, 138 may use in maintaining the target air-fuel ratios and a target volumes of the air and the fuel.

A first temperature control device such as the air pathway control device 121 may be in direct or indirect thermal contact with the air that is introduced into the engine 101, and may be used to control a temperature and/or volume of the air introduced into the engine 101. Corresponding sensors such as, for example, the mass air flow sensor 223 that measures a volume of air flowing into the intake air passages 242, 244, 246 of the engine 101 and the temperature of the intake air may be used by the controller 152 to measure the volume and temperature of the air introduced into the engine 101. Volumes and temperatures sensed by the mass air flow sensor 223 may be provided to the controller 152 for analysis. If the controller 152 determines that the volume and/or temperature of the intake air is to be adjusted in order to meet the target air-fuel ratio and the target volume of the air and the fuel introduced into the engine 101, then the controller 152 may instruct the air pathway control device 121 to adjust the volume and/or temperature of the intake air.

A second temperature control device such as the fuel pathway control device 222 may be in direct or indirect thermal contact with the fuel that is introduced into the engine 101, and may be used to control a temperature and/or volume of the fuel introduced into the engine 101. Corresponding sensors such as, for example, the fuel system 208 that measures a volume and temperature of fuel flowing through the fuel line 267 and the fuel injector 266 into the cylinder 214 of the engine 101 may be used by the controller 152 to measure the volume and temperature of the fuel introduced into the engine 101. Volumes and temperatures sensed by the fuel system 208 may be provided to the controller 152 for analysis. If the controller 152 determines that the volume and/or temperature of the fuel is to be adjusted in order to meet the target air-fuel ratio and the target volume of the air and the fuel introduced into the engine 101, then the controller 152 may instruct the fuel pathway control device 222, fuel system 208 and/or the fuel injector 266 to adjust the volume and/or temperature of the fuel.

Third temperature control device(s) such as the radiator 120, the heater core 190, and/or the thermostat valve 138 may be in direct or indirect thermal contact with the coolant that is introduced into the engine 101, and may be used to control a temperature and/or volume of the coolant introduced into the engine 101. Corresponding sensors such as, for example, the coolant sensor 139 that measures a volume and temperature of coolant flowing through the coolant lines 182 and 184, the radiator 120, the heater core 190, and the thermostat valve 138 into the engine 101 may be used by the controller 152 to measure the volume and temperature of the coolant introduced into the engine 101. Volumes and temperatures sensed by the coolant sensor 139 may be provided to the controller 152 for analysis. If the controller 152 determines that the volume and/or temperature of the coolant is to be adjusted in order to meet the target air-fuel ratio and the target volume of the air and the fuel introduced into the engine 101 (via influence from the temperature adjusting properties of the coolant), then the controller 152 may instruct the radiator 120, the heater core 190, and/or the thermostat valve 138 to adjust the volume and/or temperature of the coolant.

The controller 152 may determine the target air-fuel ratio and volume based on the type of fuel being combusted within the engine 101. For example, a fuel-air ratio for a gas engine may be different relative to a diesel engine. Further, the controller 152 may determine the target air-fuel ratio and volume based on at least one characteristic of the engine 101 such as, for example the number of cylinders 214 within the engine, the presence of a turbo or supercharger, the size of the cylinders 214, the shape of the cylinders 214 and pistons 238, other characteristics of the engine 101, and combinations thereof. Further, the controller 152 may determine the target air-fuel ratio and volume based on an elevation of operation of the engine 101. The elevation of the operation of the engine 101 may be determined using a sensor 154 such as, for example, an altimeter, GPS device or other elevation determining device included with and/or in communication with the controller 152. A look-up table may be stored in, for example, a read-only memory (ROM) device 210, a random-access memory (RAM) device 212 or a keep-alive memory (KAM) device 214 from which the controller 152 may look-up values defining volumes, air-fuel ratios, and/or temperatures as they relate to and correspond to values of elevations of operation of the engine 101. During operation, the controller 152 may refer to the look-up table for making the determination of a target air-fuel ratio and a target volume of the air and the fuel introduced into the engine 101.

The target air-fuel ratio and a target volume of the air and the fuel introduced into the engine 101 may also be based on a number of ambient environmental characteristics including, for example, an ambient humidity, an ambient temperature, an elevation, and other environmental characteristics. Further, the target volume of the air and the fuel introduced into the engine 101 may also be based on a load on the engine 101. In this example, the load may be any mechanical load that applies resistance or physical stress against which the engine 101 acts. A load on the engine 101 may cause the engine 101 operate at a higher temperature, and may result in the controller 152 adjusting the air-fuel ratio and/or the target volume of the air and the fuel introduced into the engine 101 in order to obtain the target air-fuel ratio and a target volume of the air and the fuel introduced into the engine 101 appropriate for that level of operation. The above factors including the type of the fuel, the at least one characteristic of the engine, the elevation of operation of the engine, the ambient humidity, the ambient temperature, the load on the engine, and combinations thereof may all play a role in obtaining the target air-fuel ratio and a target volume of the air and the fuel introduced into the engine 101.

In one example, the data representing the temperatures and/or volumes of the air, the fuel, and/or the coolant may be obtained from a first sensor 154-1 and a second sensor 154-2 on a periodic basis such as once every millisecond, once every second, once every minute, or other intervals of time between the acquisition of the data representing the temperatures and/or volumes of the air, the fuel, and/or the coolant. In another example, the data representing the temperatures and/or volumes of the air, the fuel, and/or the coolant may be obtained on a continuous basis.

The sensors 154 may also include a sensor 154 such as the exhaust gas sensor 228 to detect a combustion efficiency of the air and fuel within a cylinder 214 of the engine. In this example, the controller 152 may control the air pathway control device 121, the fuel pathway control device 222, and the coolant pathway control devices 120, 190, 138 to adjust the temperature of the air, fuel, and/or coolant based on the combustion efficiency.

Turning again to FIG. 2, FIG. 2 depicts an example embodiment of a combustion chamber of an engine 101 of the engine of FIG. 1, according to an example of the principles described herein. The engine 101 may receive control parameters from the controller 152 and input from an input device 232. In one example, the input device 232 may include an accelerator pedal and a pedal position sensor for generating a proportional pedal position signal to the controller 152. The combustion chamber 214 of the engine 101 may include combustion chamber walls 236 with piston 238 positioned therein. The piston 238 may be coupled to a crankshaft 240 so that reciprocating motion of the piston 238 is translated into rotational motion of the crankshaft 240. The crankshaft 240 may be coupled to at least one drive wheel of the passenger vehicle via a transmission system. Further, a starter motor may be coupled to the crankshaft 240 via a flywheel to enable a starting operation of engine 101.

The cylinder 214 may receive intake air via the series of intake air passages 242, 244, and 246. The intake air passage 246 may communicate with other cylinders of engine 101 in addition to cylinder 214. In one example, one or more of the intake passages may include a boosting device such as a turbocharger or a supercharger. For example, FIG. 2 depicts the engine 101 configured with a turbocharger including a compressor 274 arranged between intake passages 242 and 244, and an exhaust turbine 276 arranged along exhaust passage 248. The compressor 274 may be at least partially powered by an exhaust turbine 276 via a shaft 280 where the boosting device is configured as a turbocharger. However, in other examples, such as where the engine 101 includes a supercharger, exhaust turbine 276 may be optionally omitted, where compressor 274 may be powered by mechanical input from a motor or the engine 101. A throttle 220 including a throttle valve 264 may be provided along an intake passage of the engine 101 for varying the flow rate and/or pressure of intake air provided to the engine cylinders. For example, the throttle 220 may be disposed downstream of the compressor 274 as depicted in FIG. 2, or alternatively may be provided upstream of the compressor 274. For a charged internal combustion engine, a charge cooler may be arranged in an intake manifold which lowers the temperature of the aspirated charge air or fresh air and thereby increases the density of the fresh cylinder charge. In this way the charge air cooler contributes to increased filling of the combustion chamber with charge air.

Exhaust passage 248 may receive exhaust gases from other cylinders of engine 101 in addition to the cylinder 214. An exhaust gas sensor 228 is shown coupled to exhaust passage 248 upstream of the emission control device 178. The gas sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. An exhaust temperature may be measured by one or more temperature sensors (not shown) located in exhaust passage 248. Alternatively, the exhaust temperature may be inferred based on engine operating conditions such as speed, load, air-fuel ratio (AFR), and spark retard, among other operating conditions. Further, one or more exhaust gas sensors 228 may determine or sense an exhaust temperature. The exhaust gas temperature may alternatively be estimated by any combination of temperature estimation methods listed herein. Throughout the description, the output from the gas sensor 228 may be used to determine correct temperatures of the air, fuel, and/or coolant introduced into the engine 101.

Each cylinder of the engine 101 may include one or more intake valves and one or more exhaust valves. For example, the cylinder 214 is depicted in FIG. 2 as including at least one intake poppet valve 250 and at least one exhaust poppet valve 256 located at an upper region of the cylinder 214. In one example, each cylinder of the engine 101, including cylinder 214, may include at least two intake poppet valves 250 and at least two exhaust poppet valves 256 located at an upper region of the cylinder 214.

The intake valve 250 may be controlled by the controller 152 by cam actuation via a first cam actuation system 251 where the controller 152 controls the movement of the first cam actuation system 251. Similarly, exhaust valve 256 may be controlled by the controller 152 via a second cam actuation system 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 152 to vary valve operation. The operation of intake valve 250 and exhaust valve 256 may be determined by valve position sensors (not shown) and/or camshaft position sensors 255 and 257, respectively. In one example, the intake 250 and/or exhaust 256 valve may be controlled by electric valve actuation. For example, the cylinder 214 may alternatively include an intake valve controlled via electric valve actuation and an exhaust valve controlled via cam actuation including CPS and/or VCT systems. In still another example, the intake 250 and exhaust 256 valves may be controlled by a common valve actuator or actuation system, or a variable valve timing actuator or actuation system. A cam timing may be adjusted (by advancing or retarding the VCT system) to adjust an engine dilution in coordination with an EGR flow and/or a direct injection of a knock control fluid, thereby reducing EGR transients and improving engine performance.

The cylinder 214 may have a compression ratio, which is the ratio of volumes when piston 238 is at bottom center to top center. The compression ratio may be in the range of 9:1 to 10:1. However, in other examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In one example, each cylinder of the engine 101 may include a spark plug 292 for initiating combustion. An ignition system 290 may provide an ignition spark to the combustion chamber 214 via the spark plug 292 in response to a spark advance signal SA from the controller 152, under select operating modes. However, in one example, the spark plug 292 may be omitted, such as where the engine 101 may initiate combustion by auto-ignition or by injection of fuel as may be the case with some diesel engines.

In one example, each cylinder of the engine 101 may be configured with one or more injectors for providing a knock control fluid thereto. In one example, the knock control fluid may be a fuel, wherein the injector is also referred to as a fuel injector. As a non-limiting example, the cylinder 214 is depicted including one fuel injector 266. The fuel injector 266 is depicted as being coupled directly to the cylinder 214 for injecting fuel directly therein in proportion to the pulse width of signal FPW received from controller 152 via an electronic driver 268. In this manner, the fuel injector 266 provides what is known as direct injection (DI) of fuel into the combustion cylinder 214. While FIG. 2 depicts the injector 266 as a side injector, it may also be located overhead of the piston, such as near the position of the spark plug 292. Such a position may increase mixing and combustion when operating the engine with an alcohol-based fuel due to the lower volatility of some alcohol-based fuels. In another example, the injector 266 may be located overhead and near the intake valve to increase mixing. Fuel may be delivered to fuel injector 266 from a high-pressure fuel system 208 including the fuel reservoir 201, fuel pumps, and a fuel rail. In another example, fuel may be delivered by a single stage fuel pump at a lower pressure. In this example, the timing of the direct fuel injection may be more limited during the compression stroke than if a high-pressure fuel system is used. Further, while not shown, the fuel reservoir 201 may have a pressure transducer providing a signal to the controller 152. In another example, the injector 266 may be a port injector providing fuel into the intake port upstream of the cylinder 214.

While in one example, the engine 101 may be operated by injecting the variable fuel or knock control fluid blend via a single direct injector; in other examples, the engine 101 may be operated by using two injectors (a direct injector 266 and a port injector) and varying a relative amount of injection from each injector 266.

The injector 266 may deliver fuel to the cylinder 214 during a single cycle of the cylinder 214. Further, the distribution and/or relative amount of fuel or knock control fluid delivered from the injector may vary with operating conditions, such as aircharge temperature. Furthermore, for a single combustion event, multiple injections of the delivered fuel may be performed per cycle. The multiple injections may be performed during the compression stroke, intake stroke, or any appropriate combination thereof.

FIG. 2 also depicts one cylinder 214 of a multi-cylinder engine 101. As such each cylinder 214 of the engine 101 may similarly include its own set of intake/exhaust valves 250, 256, fuel injector(s) 266, and spark plug 292, among other elements. The engine 101 may further include one or more exhaust gas recirculation passages for recirculating a portion of exhaust gas from the engine exhaust to the engine intake. In the example of FIG. 2, exhaust gas may be recirculated from the exhaust passage 248 to intake passage 244 via the EGR passage 241. The amount of EGR provided to the intake passage 244 may be varied by the controller 152 controlling the EGR valve 243 located within the EGR passage 241. Further, an EGR sensor 245 may be arranged within the EGR passage and may provide an indication of one or more pressure, temperature, and concentration of the exhaust gas.

The controller 152 is depicted in FIG. 2 as a computing device such as a microcomputer, and may include a data processing device (i.e., a processor) 206 and input/output ports 208. The controller 152 may also include an electronic storage medium for storing executable programs, calibration values and look-up tables as described herein. The electronic storage medium may include devices such as, for example, the ROM device 210, the RAM device 212, the KAM device 214. Further, a data bus 213 may be included with the controller 152 to allow the elements of the controller 152 to communicate with one another and the elements of the fluid control system 100.

The controller 152 may receive various signals from sensors 154 coupled to the engine 101, in addition to those signals described herein, including a measurement of inducted mass air flow (MAF) and intake air temperature from a mass air flow sensor 223. Further, the signals may include a measurement of an engine coolant temperature (ECT) from a temperature sensor 216 coupled to cooling sleeve 218. Still further, the signals may include a measurement of a profile ignition pickup (PIP) signal from Hall effect sensor 221 (or other type of proximity, positioning, or speed detection sensor) coupled to the crankshaft 240. The signals may also include a measurement of a throttle position (TP) from a throttle position sensor. Even still further, the signals may include a measurement of a manifold absolute pressure signal (MAP) from sensor 224. An engine speed signal (e.g., in revolutions per minute (RPM)), may be generated by controller 152 from the signal PIP. A manifold pressure signal (MAP) from a manifold pressure sensor 224 may be used to provide an indication of a vacuum, or a pressure, in the intake manifold. Still other sensors 154 may include fuel level sensors and fuel composition sensors coupled to the fuel reservoir 201 of the fuel system.

The ROM device 210 may be programmed with computer readable data representing instructions executable by the processor 206 for performing the methods described herein. In this manner, the system described and depicted in FIGS. 1 and 2 enables a method of operating an engine 101 wherein a desired thermal balance is provided such that the power output of the engine 101 is increased and emissions are decreased.

The processor 206 may, through execution of computer usable program code embodied on a computer readable storage medium such as the ROM 210, the RAM 212, the KAM 214 or another computer readable storage medium, control the temperature of a plurality of the air, fuel, and/or coolant that enters the engine 101 by controlling at least one temperature control device 121, 222, 120, 190, 138. The temperature control device may include, for example, the air pathway control device 121, the fuel pathway control device 222, and the coolant pathway control devices including the radiator 120, the heater core 190, and the thermostat valve 138. Further, the processor 206 may, through execution of computer usable program code, determine a target air-fuel ratio based on sensed measurements received from the sensors 154 including pressures, volumes, temperatures, and other environmental measurements within the fluid control system 100 and in the ambient environment. Still further, the processor 206 may, through execution of computer usable program code, instruct a number of actuators 156 to obtain the target air-fuel ratio by changing temperatures and volumes of the air, fuel, and/or the coolant that is introduced into the engine 101. The target air-fuel ratio is a ratio of air and fuel introduced into the engine at a determined temperature and volume that causes the most efficient combustion of the fuel and air within the cylinders 214 of the engine 101.

In one example, the processor 206 may execute computer usable program code that defines a consistent volume ratios of the intake air and fuel entering each cylinder 214 of the engine 101 for combustion as follows:

$$R = \text{target}_{air} + \text{target}_{fuel} \qquad \text{Eq. 1}$$

where R is the consistent volume ratios of the intake air and fuel, $\text{target}_{air}$ is the target consistent intake air temperature, and $\text{target}_{fuel}$ is the target consistent fuel temperature. The coolant pathway control devices (e.g., the radiator 120, the heater core 190, and the thermostat valve 138) may be used to assist in controlling the temperature of the air and/or fuel, the engine 101, and other elements to assist in obtaining the, $\text{target}_{air}$ and the $\text{target}_{fuel}$. Further, the coolant may be brought to a target consistent coolant temperature based on the following:

$$\text{target}_{coolant} = X\% \text{ cooler system temperature} \qquad \text{Eq. 2}$$

where $\text{target}_{coolant}$ is the target consistent coolant temperature which, according to Eq. 2, is equivalent to a percentage of a cooler temperature of the fluid control system 100. As described herein, the coolant may assist in maintaining temperatures within the system 100 at a consistent temperature. Thus, even though the fuel pathway control device 222 and the air pathway control device 121 may control the temperatures (and volumes) of fuel and air that are introduced into the engine 101, the coolant pathway control devices 120, 190, 138 may maintain those target temperatures as the fuel and air are introduced into the engine 101 by regulating and conditioning the temperatures within the system 100 at a consistent temperature. In this manner, the coolant pathway control devices 120, 190, 138 assist in maintaining the air-fuel ratios as described herein.

In one example, the fluid control system 100 of FIGS. 1 and 2 functions as a fluid temperature control feedback system. The fluid temperature control feedback system may include a first sensor such as the air sensor 154-1 associated with the air pathway control device 121 to detect a temperature of air introduced into the engine 101. A second sensor such as the fuel sensor 154-2 of the air pathway control device 121 may be included within the fluid temperature control feedback system to detect a temperature of a fuel introduced into the engine. The controller 152 determines a target temperature of the air and a target temperature of the fuel to meet a target air-fuel ratio. As described herein, the ideal gas law (i.e., PV=nRT) is influenced by temperatures and volumes of the air and fuel introduced into the engine 101 during combustion. Raising the temperature of a gas increases the pressure that causes the gas to expand. The fuel added to the cylinder 214 of the internal combustion engine 101 ignites in order to raise the temperature of the gas (i.e., the fuel and air). Thus, when heat is added to the system 100, it forces gas (i.e., the fuel and air) inside to expand.

The fluid temperature control feedback system may further include a first temperature control device such as the air pathway control device 121 to adjust the temperature of the air before introduction into the engine 101. The air pathway control device 121 may also adjust the volume of the air introduced into the engine 101, and, more specifically, the cylinder 214 of the engine 101. A second temperature control device such as the fuel pathway control device 222 may also be included in the fluid temperature control feedback system to adjust the temperature of the fuel before introduction into the engine 101. Similar to the manner in which the air pathway control device 121 adjusts the volume of the air introduced into the engine 101, the fuel pathway control device 222 may adjust the volume of the fuel introduced into the engine 101, and, more specifically, the cylinder 214 of the engine 101. The fluid temperature control feedback system created by the elements of the fluid control system 100 may utilize data representing the temperatures of the air and the fuel as detected by the first sensor 154-2 and the second sensor 154-1 is used by the controller 152 to instruct the first temperature control device 121 and the second temperature control device 222. The instructions include instructing the first temperature control device 121 and/or the second temperature control device 222 to adjust the temperatures and/or volumes of the air and fuel, respectively.

The fluid temperature control feedback system may further include a third sensor such as the coolant sensor 139 to detect a temperature of a coolant introduced into the engine 101 and its cooling pathways. The coolant sensor 139 may also detect a volume of the coolant throughout the fluid control system 100. At least a third temperature control device such as the coolant pathway control devices 120, 190, 138 may be instructed by the controller 152 to adjust the temperature of the coolant before introduction into the engine 101. The controller 152 determines a target temperature of the coolant to meet the target air-fuel ratio. Further, the controller 152 uses the data representing the temperatures and/or volumes of the air and the fuel to instruct the first temperature control device (e.g., the air pathway control device 121) and the second temperature control device (e.g., the fuel pathway control device 222) on a continuous basis as the data is received from the first sensor 154-1 and a second sensor 154-2. The data representing the temperatures and/or volumes of the air and the fuel may be obtained from the first sensor 154-1 and a second sensor 154-2 on a periodic basis (e.g., once within an interval of time) or on a continuous basis. The first temperature control device (e.g., the air pathway control device 121) and the second temperature control device (e.g., the fuel pathway control device 222) control the temperatures and/or volumes of the air and fuel before introduction into the cylinder 214 (i.e., the combustion chamber) of the engine 101. The feedback loop created by the fluid temperature control feedback system described herein creates a situation where the temperatures and/or volumes of the fuel, air, and/or coolant may be controlled in real time and as the temperatures and volumes change beyond a point where the air-fuel ratios vary beyond at least one threshold past the target air-fuel ratio that brings about the most efficient combustion of the fuel and air within the cylinder 214 of the engine 101. In the examples described herein, the temperature of the air, fuel, and/or coolant may be maintained within a threshold range +/− a number of degrees, and percentage of degrees, or other distances that create the range of temperatures. In the examples described herein, the air pathway control device 121, the fuel pathway control device 222, and/or the coolant pathway control devices 120, 190, 138 may be use to return the temperatures of the air, fuel, and/or coolant to temperatures between the upper threshold and a lower threshold in instances where the temperature of the air, fuel, and/or coolant exceed the upper or lower thresholds. Further, in these examples, the volume of the air, fuel, and/or coolant may be adjusted to maintain the respective temperatures of the air, fuel, and/or coolant within the threshold range or return the respective temperatures of the air, fuel, and/or coolant to temperatures within the threshold range.

Figure 3:
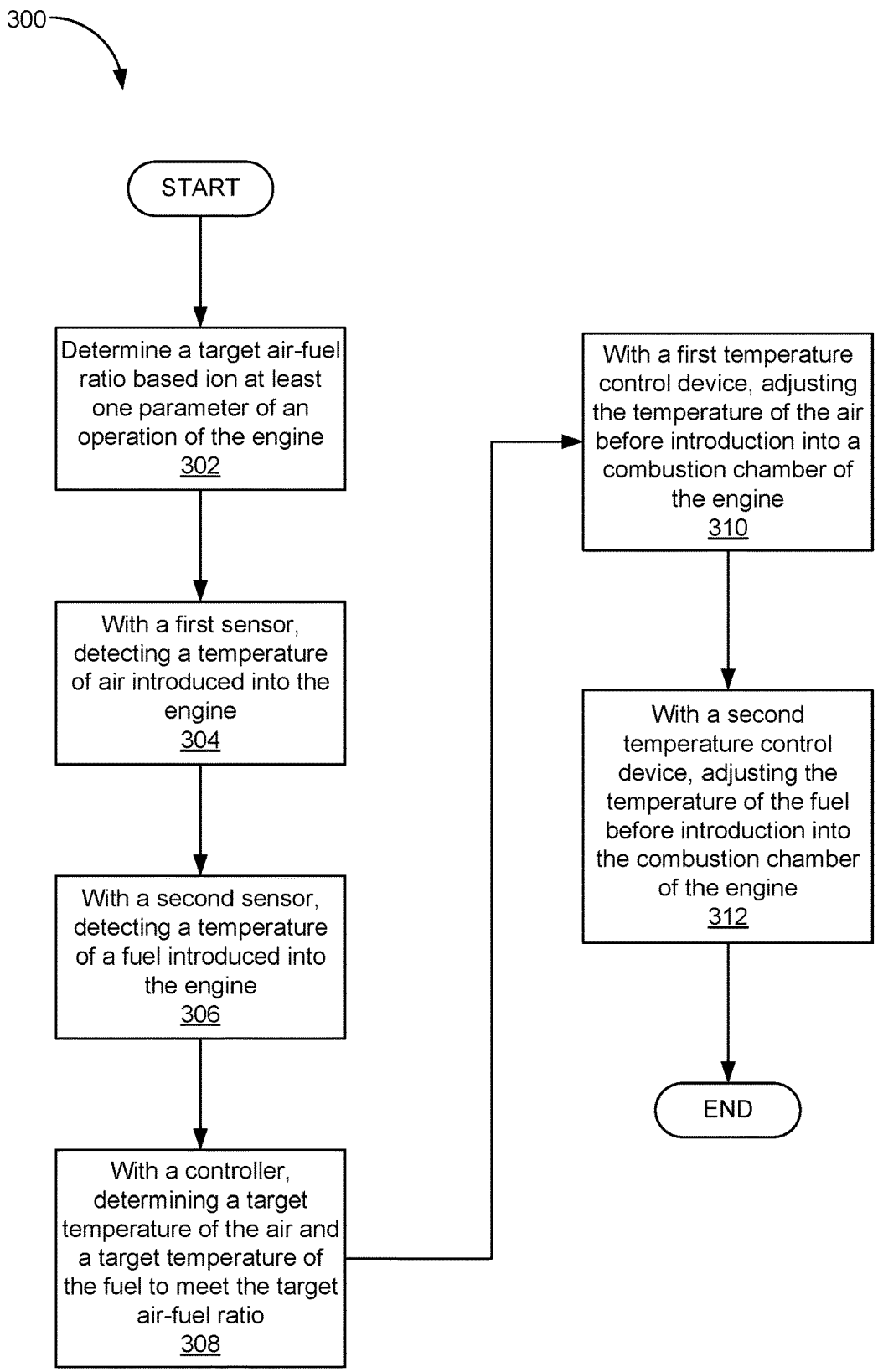
FIG. 3 is a flowchart depicting a method of controlling fluid temperature within an engine, according to an example of the principles described herein.

Having described the fluid control system 100, FIGS. 3 and 4 will now be described in connection with the methods described herein. FIG. 3 is a flowchart depicting a method 300 of controlling fluid temperature within an engine, according to an example of the principles described herein. The term "fluid" as used herein includes any substance that influences the functioning of the engine 101 including any substance that is introduced into the engine 101 as a gas or liquid. Examples of fluids may include the fuel, the air, and the coolant described herein.

The method 300 may include determining at block 302 a target air-fuel ratio based on at least one parameter of an operation of the engine 101. The parameters of operation of the engine 101 may include any environmental characteristic present during the operation of the engine 101 internal to and/or external to the engine 101. Examples of these parameters include, type of fuels used, the chemical composition of the fuels used, the level of oxygen within the air, the level of water within the fuel and/or air, the elevation or altitude at which the engine 101 is operated, at least one characteristic of the engine 101 such as volumes and numbers of the cylinder(s) 214 within the engine, a load placed on the engine 101, temperatures internal and external to the engine 101, humidity levels, barometric pressures, and other environmental characteristics that may affect the pressures, volumes, and temperatures associated with the combustion of the air and fuel within the engine 101 according to the ideal gas law.

At block 304, the controller 152 may instruct a first sensor such as the air sensor 154-1 to detect a temperature of air introduced into the engine 101. A second sensor such as the fuel sensor 154-2 may be instructed by the controller 152 to detect a temperature of a fuel introduced into the engine 101 at block 306. The controller 152, at block 308, determines a target temperature of the air and a target temperature of the fuel to meet the target air-fuel ratio. The controller 152 may perform a number of calculations based on the ideal gas law to determine the temperatures and volumes that are to be used in order to reach the target air-fuel ratio. At block 310, a first temperature control device such as the air pathway control device 121 may be instructed by the controller 152 to adjust the temperature of the air before introduction into a combustion chamber (i.e., the cylinder 214) of the engine 101. Further, at block 312, the controller 152 may instruct a second temperature control device such as the fuel pathway control device 222 to adjust the temperature of the fuel before introduction into the combustion chamber (i.e., the cylinder 214) of the engine 101. In this manner, the controller 152 causes at least the temperature of the fuel and air to be adjusted in order to reach and maintain the target air-fuel ratio.

Figure 4:
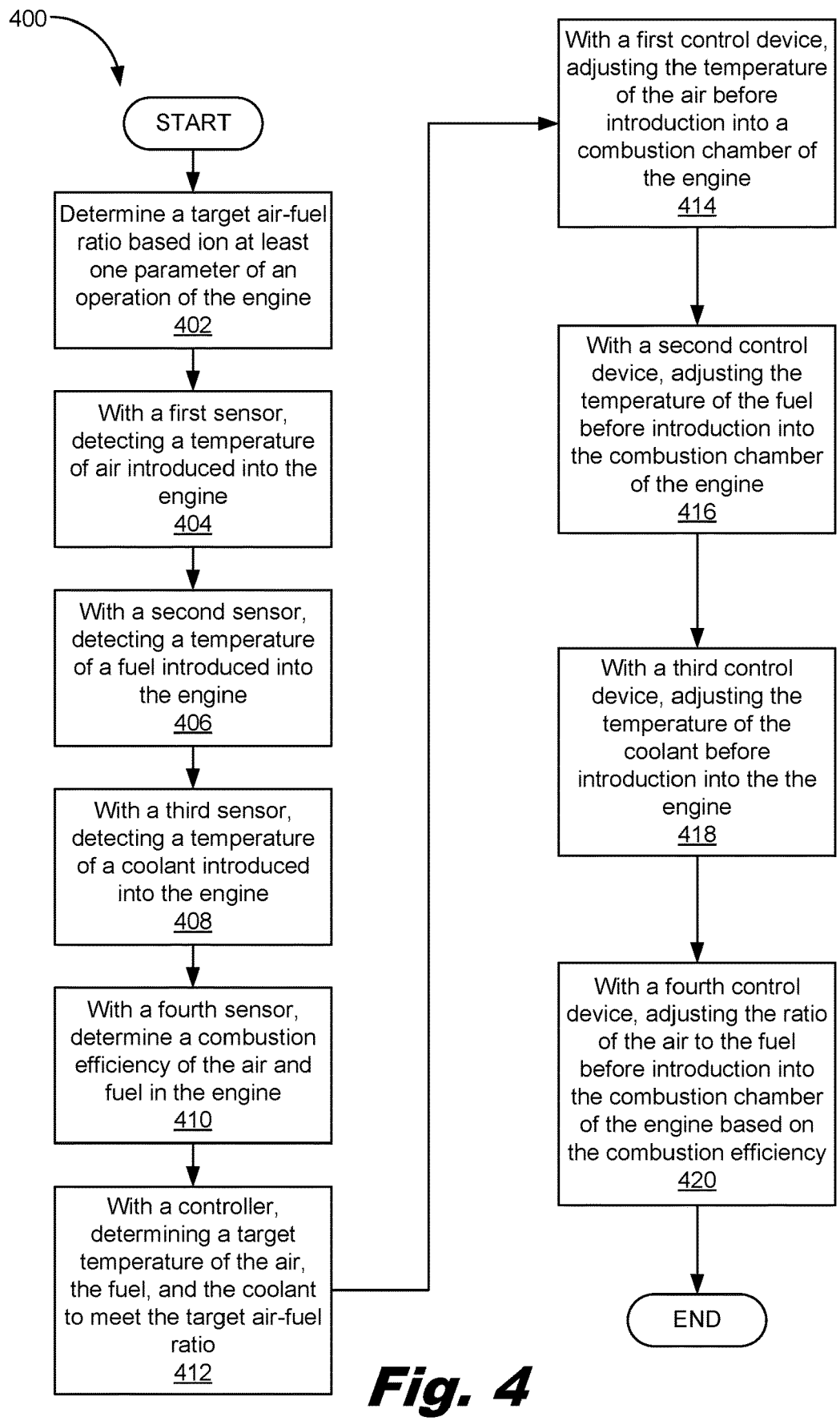
FIG. 4 is a flowchart depicting a method of controlling fluid temperature within an engine, according to an example of the principles described herein.

FIG. 4 is a flowchart depicting a method 400 of controlling fluid temperature within an engine, according to an example of the principles described herein. At block 402 a target air-fuel ratio based on at least one parameter of an operation of the engine 101. At block 404, the controller 152 may instruct a first sensor such as the air sensor 154-1 to detect a temperature of air introduced into the engine 101. A second sensor such as the fuel sensor 154-2 may be instructed by the controller 152 to detect a temperature of a fuel introduced into the engine 101 at block 406.

At block 408, the controller 152 may instruct a third sensor such as the air sensor 154-1 to detect a temperature of coolant introduced into the engine 101. The third sensor may include the coolant sensor 139 used to detect the temperature and/or volume of the coolant throughout the fluid control system 100 and transmit that information to the controller 152. A fourth sensor, at block 410, may determine a combustion efficiency of the air and fuel in the engine 101. In one example, the fourth sensor may include the exhaust gas sensor 228 depicted in FIG. 2.

The controller 152, at block 412, determines a target temperature of the air and a target temperature of the fuel to meet the target air-fuel ratio. The controller 152 may perform a number of calculations based on the ideal gas law as described herein to determine the temperatures and volumes that are to be used in order to reach the target air-fuel ratio. At block 414, a first control device such as the air pathway control device 121 may be instructed by the controller 152 to adjust the temperature of the air before introduction into a combustion chamber (i.e., the cylinder 214) of the engine 101 based on the calculations performed by the controller 152 in an effort to obtain the target air-fuel ratio. Further, at block 416, the controller 152 may instruct a second temperature control device such as the fuel pathway control device 222 to adjust the temperature of the fuel before introduction into the combustion chamber (i.e., the cylinder 214) of the engine 101 based on the calculations performed by the controller 152, again, in an effort to obtain the target air-fuel ratio. Further, at block 418, the third temperature control device such as the coolant pathway control devices 120, 190, 138 may be instructed by the controller 152 to adjust the temperature of the coolant before introduction into the engine 101. In this manner, the controller 152 causes at least the temperature of the fuel and air to be adjusted vis-a-vis the indirect influence of the temperature of the coolant in order to reach and maintain the target air-fuel ratio.

At block 420, a fourth control device such as the first cam actuation system 251, the fuel pathway control device 222, the fuel injector 266, the ignition system 290, the compressor 274, other devices associated with mixing volumes of fuel and air, and combinations thereof before introduction of the air and fuel into the cylinder 214 based on the combustion efficiency determined at block 410. Thus, the method 400 of FIG. 4 may assist in obtaining the target air-fuel ratio by adjusting temperatures and volumes of the fuel and air. Adjusting the temperature of the air, the fuel, and the coolant includes heating the air, heating the fuel, heating the coolant, cooling the air, cooling the fuel, cooling the coolant, or combinations thereof.

INDUSTRIAL APPLICABILITY

The present disclosure describes systems and methods for controlling fluid temperatures within an engine. This is done in order to obtain a stronger and more consistent power stroke of the pistons 238 within the cylinders 214 (also referred to as "combustion chambers"). Further, cleaner emissions from the engine 101 may be obtained using the methods and systems described herein because more of the fuel introduced into the cylinders 214 is combusted. In some examples where the engine 101 consumes diesel fuel, the combustion rate of the diesel fuel may be so effective, the use of diesel exhaust fluid (DEF) used to burn excess oxides and exhaust may no longer be necessary. Still further, fuel mileage will increase since combustion will be more robust and consistent using the methods and systems described herein. The life of the engine 101 and associated elements and sub-elements including turbo systems, coolants, and oils may be increased as well when the methods and systems described herein are employed. The overall temperature of the engine 101 and fluids may be lower and more consistent.

Further, using the methods and systems described herein may cause the fuel to remain more stable. For example, in the case where diesel fuel is combusted in the engine 101, a constant fuel temperature may result in the diesel fuel no longer freezing or "gelling" in the fuel reservoir 201, the fuel line 267, fuel filters, and other elements of the fuel system of the vehicle 102 during operation of the engine 101. The methods and systems described herein may reduce condensation resulting in a decrease or elimination of water within the engine 101.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the controller (251) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium. The components described herein represent instructions that may be stored in any type of computer-readable medium and may be implemented in software and/or hardware. All of the methods and processes described herein may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

While aspects of the present disclosure have been particularly shown and described with reference to the examples above, it will be understood by those skilled in the art that various additional examples may be contemplated by the modification of the disclosed machines, systems, and methods without departing from the spirit and scope of what is disclosed. Such examples should be understood to fall within the scope of the present disclosure as determined based upon the claims and any equivalents thereof.

What is claimed is:

1. A fluid control system for an engine comprising:
an air pathway to carry air to the engine;
a fuel pathway to carry a fuel to the engine;
a first temperature control device to control a temperature of the air; and
a second temperature control device to control a temperature of the fuel, wherein the first temperature control device maintains the air at a temperature of a target air-fuel ratio and a target volume of the air by adjusting the temperature of the air by heating the air and cooling the air based at least in part on feedback from at least one first sensor defining a deviation from the target air-fuel ratio and the target volume of the air, and
wherein the second temperature control device maintains the fuel at a temperature of the target air-fuel ratio and a target volume of the fuel by adjusting the temperature of the fuel by heating the fuel and cooling the fuel based at least in part on feedback from the at least one second sensor different from the at least one first sensor defining a deviation from the target air-fuel ratio and the target volume of the fuel.

2. The system of claim 1, further including a coolant pathway to carry a coolant to the engine, wherein a third temperature control device controls the temperature of the coolant and maintains the air, the fuel, and the coolant at a temperature based on the target air-fuel ratio and the target volume of air and the target volume of the fuel.

3. The system of claim 2, including:
a controller to control at least one function of the engine;
the at least one first sensor electrically coupled to the controller and located within an environment external to the engine, the at least one first sensor to:
sense at least one property of the environment; and
send a data signal to the controller including data defining the property; and
at least one actuator electrically coupled to the controller to:
receive control signals from the controller to move at least one element of the engine based on the data.

4. The system of claim 3, wherein the controller controls the first temperature control device and the second temperature control device based on the data signal received from the at least one first sensor, the first temperature control device and the second temperature control device to change the temperature of the fuel, the air, and the coolant.

5. The system of claim 3, wherein the controller, the at least one first sensor, the first temperature control device, and the second temperature control device function as a feedback loop to maintain the air, the fuel, and the coolant at the temperature based on the target air-fuel ratio and the target volume of the air and the fuel.

6. The system of claim 3, wherein data representing the temperatures of the air and the fuel are obtained from the first sensor and the second sensor on a periodic basis or on a continuous basis.

7. The system of claim 2, wherein:
the first temperature control device is in thermal contact with the air pathway;
the second temperature control device is in thermal contact with the fuel pathway; and
the third temperature control device is in thermal contact with the coolant pathway.

8. The system of claim 1, wherein the target air-fuel ratio is determined based on a type of the fuel, at least one characteristic of the engine, an elevation of operation of the engine, an ambient humidity, an ambient temperature, a load on the engine, or combinations thereof.

9. The system of claim 1, wherein the temperature control device controls the temperatures of the air and the fuel before introduction of the air and fuel into a combustion chamber of the engine.

10. The system of claim 1, further including:
a third sensor to detect a combustion efficiency of the air and fuel within the engine,
wherein the controller controls the first temperature control device and the second temperature control device to adjust the temperature of the air and the temperature of the fuel based on the combustion efficiency.

11. A method of controlling fluid temperature within an engine, comprising:
determining a target air-fuel ratio based on at least one parameter of an operation of the engine;
with a first sensor, detecting a temperature of air introduced into the engine;
with a second sensor, detecting a temperature of a fuel introduced into the engine;
with a controller, determining a target temperature of the air and a target temperature of the fuel to meet the target air-fuel ratio;
with a first control device, adjusting the temperature of the air before introduction into a combustion chamber of the engine to the target air-fuel ratio and a target volume of the air and the fuel by heating the air and cooling the air based at least in part on feedback from at least one of the first sensor and the second sensor defining a deviation from the target air-fuel ratio and the target volume of the air; and
with a second control device, adjusting the temperature of the fuel before introduction into the combustion chamber of the engine to the target air-fuel ratio and the target volume of the air and the fuel by heating the fuel and cooling the fuel based at least in part on feedback from at least one of the first sensor and the second sensor defining a deviation from the target air-fuel ratio and the target volume of the fuel.

12. The method of claim 11, further including:
with a third sensor, detecting a temperature of a coolant introduced into the engine;
with the controller, determining a target temperature of the coolant to meet the target air-fuel ratio; and
with a third control device, adjusting the temperature of the coolant before introduction into the engine.

13. The method of claim 12, wherein adjusting the temperature of the air, the fuel, and the coolant further comprises heating the air, heating the fuel, heating the coolant, cooling the air, cooling the fuel, cooling the coolant, or combinations thereof.

14. The method of claim 11, wherein the target air-fuel ratio is determined based on a type of the fuel, at least one characteristic of the engine, an elevation of operation of the engine, an ambient humidity, an ambient temperature, or combinations thereof.

15. The method of claim 11, further including:
determining a combustion efficiency of the air and fuel within the engine; and
adjusting the ratio of the air to the fuel based on the combustion efficiency.

16. A fluid temperature control feedback system comprising:
a first sensor to detect a temperature of air introduced into an engine;

a second sensor to detect a temperature of a fuel introduced into the engine;

a controller to determine a target temperature of the air and a target temperature of the fuel to meet a target air-fuel ratio;

a first temperature control device to adjust the temperature of the air before introduction into the engine to the target air-fuel ratio and a target volume of the air and the fuel by heating the air and cooling the air based at least in part on feedback from at least one of the first sensor and the second sensor defining a deviation from the target air-fuel ratio and the target volume of the air; and a second temperature control device to adjust the temperature of the fuel before introduction into the engine to the target air-fuel ratio and the target volume of the air and the fuel by heating the fuel and cooling the fuel based at least in part on feedback from at least one of the first sensor and the second sensor defining a deviation from the target air-fuel ratio and the target volume of the fuel, wherein data representing the temperatures of the air and the fuel as detected by the first sensor and the second sensor is used by the controller to instruct the first temperature control device and the second temperature control device.

17. The system of claim 16, further including:

a third sensor to detect a temperature of a coolant introduced into the engine; and a third temperature control device to adjust the temperature of the coolant before introduction into the engine wherein the controller determines a target temperature of the coolant to meet the target air-fuel ratio.

18. The system of claim 16, wherein the controller uses the data representing the temperatures of the air and the fuel to instruct the first temperature control device and the second temperature control device on a continuous basis as the data is received from the first sensor and the second sensor.

19. The system of claim 18, wherein the data representing the temperatures of the air and the fuel are obtained from the first sensor and the second sensor on a periodic basis or on a continuous basis.

20. The system of claim 16, wherein the first temperature control device and the second temperature control device control the temperature of the air and fuel before introduction into a combustion chamber of the engine.

* * * * *